Nov. 28, 1961 R. W. KETCHLEDGE 3,011,151

SIGNAL COMPARISON SYSTEM

Filed April 27, 1956 4 Sheets-Sheet 1

INVENTOR
R. W. KETCHLEDGE
BY [signature]
ATTORNEY

INVENTOR
R. W. KETCHLEDGE
BY [signature]
ATTORNEY

INVENTOR
R. W. KETCHLEDGE
BY [signature]
ATTORNEY

INVENTOR
R. W. KETCHLEDGE
BY
[signature]
ATTORNEY

United States Patent Office
3,011,151
Patented Nov. 28, 1961

3,011,151
SIGNAL COMPARISON SYSTEM

Raymond W. Ketchledge, Whippany, N.J., assignor to Bell Telephone Laboratories, Incorporated, New York, N.Y., a corporation of New York Filed Apr. 27, 1956, Ser. No. 581,175
14 Claims. (Cl. 340—149)

This invention relates to electrical signal comparison systems and more particularly to systems for comparing binary code signals.

The invention may be exemplified in its practical application in systems employing binary codes; that is, systems in which a code group consists of a numerical sequence of any number of 0's or 1's in any permutation arrangement. Therefore any individual element of such a code consists of a 0 or 1. These 0 and 1 elements may be differentiated from each other in practical arrangements by conditions of current and no current, positive current and negative current, or by other pairs of suitable conditions.

The prior art offers systems and methods of checking the accuracy of received or recorded binary code combinations or numbers. Systems for changing from one code form such as the conventional binary code, a code following the binary scale of notation, into another code form, such as the reflected binary code described in the patent of F. Gray, No. 2,632,058, issued March 17, 1953, are also known in the art. The prior art, however, fails to disclose any means for comparing multi-digit binary numbers to obtain an indication of their relative magnitudes.

The use of binary code combinations has been extended to the positioning of an electron beam of a cathode ray device to read other binary information stored in various forms on discrete areas of a target surface such as in the barrier grid store disclosed in the patent of R. W. Sears, No. 2,675,499, issued April 13, 1954, and in the flying spot store disclosed in R. C. Davis and R. E. Staehler, Patent No. 2,830,285, issued April 8, 1958. Such systems are limited in storage capacity by the amount of information which can be stored in the space limits fixed by the range of the cathode ray beam. Maximum use must be made of the available space by closely packing the discrete information bearing storage areas, but this practice renders more acute the problem of achieving rapid and accurate positioning of the beam on a desired discrete area of the storage surface to assure readout of the proper information.

The aforementioned application of Davis and Staehler describes a feedback system which substantially decreases the need for complex and cumbersome positioning elements by assuring that the position achieved by the positioning elements matches the discrete area of beam impingement, and if not, the error is detected and appropriate repositioning signals are applied to the cathode ray tube deflection plates to achieve proper positioning prior to readout. This system also employs a final address check slide in addition to initial positioning slides to assure proper positioning. Each discrete area on this slide contains the counterpart of a single binary digit, which in effect, is matched with the corresponding digit in the input address. Once the beam is positioned on a starting or address area by the coordinate positioning slides, readout begins by deflection of the beam in a preassigned raster. A digit-by-digit comparison of the first few digits from the final address check slide with the corresponding digits of the binary input signal will determine if the correct information is actually being read out, and if not, steps are taken to reposition the beam to the correct readout position.

An improvement on this repositioning scheme is disclosed in C. W. Hoover, Jr., Patent No. 2,855,539, issued October 7, 1958. In this scheme the light beam from a cathode ray tube is modified by an optical system to present a ribbon beam to the positioning slides. Instantaneous readout from the positioning slides of entire binary numbers representing the coordinate positioning binary numbers is thus achieved, and the need for and delay encountered in the use of a final address check slide is eliminated.

The original flying spot storage system requires a comparison digit-by-digit of the address input information and the feedback positioning information. The improvement of C. W. Hoover, Jr. in Patent No. 2,855,539, described hereinbefore, requires the comparison of entire binary numbers with the resultant signals serving to drive the deflection plates of the cathode ray tube so as to deflect the beam in one of two directions in accordance with the relative magnitudes of the applied numbers. My invention is well adapted to perform such a comparison and produce the desired resultant signals.

A comparison of binary numbers in accordance with this invention may also be employed to advantage in pulse code modulation systems and in positioning systems utilizing a monitor cathode ray tube to control the positioning of a beam in a storage or other cathode ray device.

It is an object of this invention to provide a binary number comparison system.

It is another object of this invention to compare two binary numbers of the same order and to provide one of two output characteristics dependent upon the larger of the compared numbers.

It is another object of this invention to compare two binary numbers of different binary code forms so as to provide one of two output characteristics dependent upon the larger of the compared numbers.

The above objects are attained in accordance with the invention by the application to the comparator network of each of the various digits of a first binary number as one of two electrical signals, each digit being allotted a distinct input in one of several stages of the comparator network. Each of the various digits of a second binary number to be compared with the first binary number is applied to another input in the same stage as the corresponding digit in significance of the former number. Thus the most significant digit in each binary number is applied to one stage of the comparator via separate input leads, succeeding digits of lesser significance being applied to other stages thereof in similar fashion. The various stages are interconnected in common to a single output from the comparator, which output in turn provides one of two electrical signals dependent upon the results of the binary number comparisons.

In one illustrative embodiment of this invention each stage of the comparator comprises a series of logic circuits of the AND and OR variety. Logical AND circuits are variously known as gates or coincidence circuits and are employed generally throughout computer operation. Generally a logical AND circuit or gate is a circuit having a plurality of inputs and a single output and is so designed that an output signal is obtained only when input signals are received simultaneously on each of the inputs. A logical OR circuit, sometimes referred to as a buffer or isolating circuit, is a circuit having a plurality of inputs and a single output and is designed to produce an output signal when signals are received at one or more inputs.

The arrangement in this illustrative embodiment of this invention is such that each digit of one conventional binary code number is compared with the complement of its counterpart in another conventional binary code number in distinct comparison circuits containing an AND circuit or logic gate and an OR circuit or logic gate. The outputs of the OR circuits are applied to a final circuit, which may comprise an AND logic gate, and which in turn applies a signal in the output circuit of one characteristic if its inputs are of one signal type and applies a signal in the output circuit of another characteristic if any or all of its inputs are of the other signal type. The outputs of the AND circuits are applied to the OR circuit in the next succeeding stage; i.e., the stage comparing digits of next lower significance. The end result is the formation in the output circuit of a distinct signal indicating that one of the input binary code numbers is equal to or larger than the other input binary code number or the formation of another distinct signal indicating that the latter input binary code number is the larger.

A first conventional binary code number equals or is larger than a second conventional binary code number, if the comparison of the complement of the second number with the first number reveals at least a "one" digit for each digit position, with the exception that corresponding digit positions need not contain a "one" digit if at least one corresponding more significant digit position in both numbers contains a "one" digit.

For example, a comparison of the conventional binary code number 110 (6) with the prime 011 of the conventional binary code number 100 (4) reveals at least a "one" digit for each digit position. Thus, the former number is larger than the latter number. The number 100 (4), when compared with the complement 100 of the number 011 (3), reveals a "one" digit in the most significant digit position of each number. "One" digits do not appear in any other digit positions but since a digit position need not contain a "one" if at least one more significant digit position indicates a "one" digit in both numbers, the former number again is larger than the latter number.

Thus, in order to obtain an indication of the relative magnitude of two conventional binary code numbers, I have found that it is only necessary to determine, (1) is at least one of the digits in each corresponding digit position of the two numbers a "one," and if not, (2) is there a "one" in both digit positions of a corresponding digit position of greater significance. An affirmative answer to one or both questions, or a negative answer to both questions, determines the relative magnitudes of the two numbers.

The comparison circuit of this embodiment of this invention implements this determination. The OR circuit in the distinct comparison circuit associated with each corresponding pair of digits of one significance, receives both digit signals. If a "one" digit is present, the OR circuit will so indicate to the final circuit. An affirmative answer to the first question requires an indication of the presence of a "one" to the final circuit by the OR circuits of each distinct comparison circuit.

The AND circuit in each distinct comparison circuit provides the answer to the second question. The presence of a "one" digit signal on each of its input leads connected to corresponding digits of one significance, results in an output signal which requires the OR circuits in less significant digit comparison circuits to provide an indication of the presence of a "one" to the final circuit, whether or not a "one" is present in the less significant digits. In this fashion, all of the OR circuits again may provide an indication of the presence of a "one" to the final circuit, supplying an affirmative answer to the second question.

Thus an indication of a "one" to the final circuit by all of the OR circuits, results in an output signal indicating that one input number equals or is larger than another input number. Lack of such a "one" indication by at least one OR circuit, results in an output signal indicating that the latter number is larger than the former number.

In another illustrative embodiment of this invention an additional logic circuit is employed in each stage other than that for the most significant digit, which additional logic circuit permits the achievement of the desired results in comparison of a conventional binary code number and a reflected binary code number.

It is a feature of this invention that signals representing two binary code numbers be applied to a series of logic circuits and a selected one of two possible signals indicative of the larger of the two binary code numbers be derived at a common output.

It is a more specific feature of this invention that signals representing corresponding digits of two binary code numbers to be compared be applied to input logic circuits and a selected one of two possible signals indicative of the larger of the two binary code numbers be derived at a common logic circuit connected to the outputs of the several input logic circuits.

It is a feature of one specific embodiment of this invention that the various input logic circuits comprise a parallel arrangement of AND and OR logic circuits and the common logic circuit comprise an AND logic circuit.

It is a more specific feature of this invention that first OR circuits be connected in parallel with first AND circuits, that signals representing digits of corresponding significance in each of two binary numbers be applied to the parallel inputs to each pair of said circuits, that the outputs of the first OR circuits be applied to a final AND circuit and that the output of the first AND circuit of each parallel connected circuit be applied to the OR circuit receiving signals for digits of next lesser significance.

It is another feature of this invention that the final AND circuit be arranged to provide a distinctive signal in its output path if all input signals thereto are of one range of values and to provide a different distinctive signal in its output path if one or more of the input signals thereto fall in another range of values.

It is a feature of another specific embodiment of this invention that a digit of a particular significance in one binary number be applied to one input of a logic circuit and a digit of lesser significance in the second binary number be applied to a second input to the logic circuit, the output of the logic circuit being applied to the parallel AND and OR circuits in lieu of the binary number digit signal for the second binary number.

A complete understanding of this invention and of these and various other features thereof may be gained from consideration of the following detailed description and the accompanying drawing in which.

Figure 1:
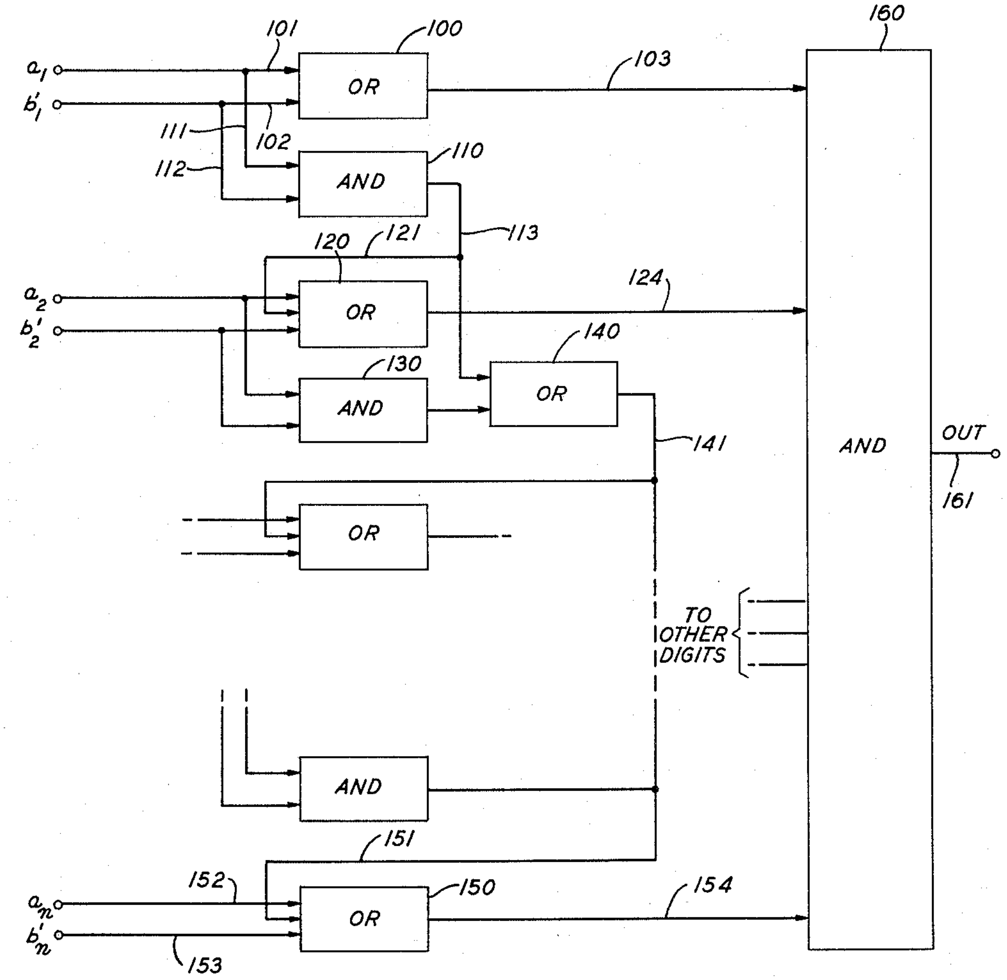
FIG. 1 is a diagrammatic representation of one specific illustrative embodiment of this invention.

Referring now to the drawing, FIG. 1 depicts an illustrative embodiment of this invention utilizing an arrangement of logic circuits to compare the the conventional binary code number $a_1a_2a_3 \ldots a_n$ with the conventional binary code number $b_1b_2b_3 \ldots b_n$. The most significant digit $a_1$ of one of the two numbers is applied as a selected one of two discrete voltage levels on input lead 101 of the logical OR circuit 100 and on input lead 111 of the logical AND circuit 110. Similarly the signal representing the inverse or prime ($b_1'$) of the most significant digit $b_1$ of the second number is applied to input 102 of OR circuit 100 and input 112 of AND circuit 110. The two discrete input voltage levels represent the binary digits "one" and "zero" and the explanation hereinafter will allude to the condition of the circuit in terms of the presence of a "one" or a "zero."

OR circuit 100 will provide an output "one" whenever an input "one" is present on lead 101 or lead 102. AND circuit 110 will provide a "one" output only when a "one" is present on both input leads 111 and 112. Thus, if both of the digits $a_1$ and $b_1'$ are "ones," circuits 100 and 110 will provide "ones" on their respective outputs leads 103 and 113. If only one of the input digits is a "one," lead 103 will indicate a "one" output and lead 113 will indicate a "zero" output. If both input digits are "zeros" both leads 103 and 113 will indicate a "zero" output.

Succeeding corresponding digits of each number are applied to similar comparison circuit arrangements of AND and OR logic circuits in order of decreasing significance. The resultants are the same as achieved in circuits 100 and 110 with the additional resultant of a "one" output from the OR circuit of each comparison circuit, such as 120, if a corresponding pair of digits received in a more significant digit comparison circuit are both "ones." Thus, if $a_1$ and $b_1'$ are "ones" the output of AND circuit 110 will reflect a "one," effective to produce a "one" output from OR circuit 120, from OR circuit 140 and from OR circuits in succeeding comparison circuits including the final OR circuit 150, evaluating the least significant digits $a_n$ and $b_n'$.

Final circuit 160 will provide one signal on its output lead 161 if all of its inputs over leads including leads 103, 124 and 154 are "ones" and a second signal if one or more of the input leads contain a "zero." The result is that if one of the numbers equals or is greater than the inverse or prime of the second number, the output will be one of the first and second signals, and if the first number is less than the prime of the second number, the output will be the other signal.

To demonstrate these results, let it first be assumed that the first conventional binary code number $a_1a_2 \ldots a_n$ is 110 and that the second conventional binary code number $b_1b_2 \ldots b_n$ is also 110. The first number 110 and the inverse or prime 001 of the second number are applied to the respective input leads $a_1, a_2, a_n$ and $b_1', b_2', b_n'$. Since each pair of digits of corresponding significance in the numbers 110 and 001 presents a "one" to each of the OR circuits 100, 120 . . . 150, all of the inputs to final AND circuit 160 contain "ones" and the output on lead 161 assumes a first one of two distinctive signal conditions to indicate that $a_1a_2a_n$ equals or is larger than $b_1b_2b_n$.

Assume now that the first number is changed to 111 which is greater than the second number 110. Each pair of digits of corresponding significance in the first number 111 and the prime (001) of the second number 110 again presents a "one" to each of the OR circuits 100, 120 . . . 150 so that all of the inputs to the final AND circuit contain "ones" and the output on lead 161 is unchanged, indicating that $a_1a_2a_n$ still equals or is larger than $b_1b_2b_n$.

Assume further that the second number $b_1b_2b_n$ remains as 110 and the first number $a_1a_2a_n$ is changed to 100, which is less than the second number. In this instance the number 100 is applied to the $a_1a_2a_n$ leads and the prime of the number 110; viz, 001, is applied to the $b_1'b_2'b_n'$ leads. Thus with $a_1$ and $b_1'$ containing a "one" and "zero" respectively, OR circuit 100 provides a "one" output on lead 103 and AND circuit 110 provides a "zero" output on lead 113. The digits $a_2$ and $b_2'$ are both zeros, so that OR circuit 120 fails to receive a "one" on any of its three input leads and provides a "zero" on its output lead 124. Final AND circuit 160, receiving a "zero" on one of its input leads, provides the second distinctive signal on its output lead 161 to indicate that $a_1a_2a_n$ is less than $b_1b_2b_n$.

Assume finally that the first number $a_1a_2a_n$ is changed to 011 which again is less than the second number 110. The digits of the first number 011, are applied respectively to the $a_1$, $a_2$ and $a_n$ inputs in FIG. 1 and the prime (001) of the digits of the second number 110 are applied to the $b_1'$, $b_2'$ and $b_n'$ inputs. Since the most significant digit in each applied number is "zero" it is at once apparent that OR circuit 100 provides a "zero" output and final AND circuit 160, having at least one "zero" on its inputs, provides the second distinctive signal on its output lead 161, indicating again that $a_1a_2a_n$ is less than $b_1b_2b_n$.

The following tables further demonstrate these results. Table I shows the comparisons of all possible combinations of two, three digit $a_1a_2a_3$ and $b_1'b_2'b_3'$ binary numbers which for ease of understanding have been added arithmetically digit-by-digit. Only three digit numbers have been used to simplify the table, but it will be appreciated that there is no limit to the number of digits in the conventional binary code numbers which may be compared in accordance with this embodiment of this invention.

*Table I*

| Dec. No. | Dec. No. — $a_1a_2a_3$ / $b_1'b_2'b_3'$ | 7<br>111 | 6<br>110 | 5<br>101 | 4<br>100 | 3<br>011 | 2<br>010 | 1<br>001 | 0<br>000 |
|---|---|---|---|---|---|---|---|---|---|
| 7 | 111 | 222 | 221 | 212 | 211 | 122 | 121 | 112 | 111 |
| 6 | 110 | 221 | 220 | 211 | 210 | 121 | 120 | 111 | 110 |
| 5 | 101 | 121 | 211 | 202 | 201 | 112 | 111 | 102 | 101 |
| 4 | 100 | 211 | 210 | 201 | 200 | 111 | 110 | 101 | 100 |
| 3 | 011 | 122 | 121 | 112 | 111 | 022 | 021 | 012 | 011 |
| 2 | 010 | 121 | 120 | 111 | 110 | 021 | 020 | 011 | 010 |
| 1 | 001 | 112 | 111 | 102 | 101 | 012 | 011 | 002 | 001 |
| 0 | 000 | 111 | 110 | 101 | 100 | 011 | 010 | 001 | 000 |

It will be noted from Table I that on the diagonal the sums are all 111. All sums above the diagonal contain "zeros" only when preceded by a "two"; i.e., two "ones" in the same digit position, and all sums below the diagonal contain at least one "zero" that is not preceded by a "two." We have demonstrated in the discussion of FIG. 1 that the presence of a "zero" on any of the input leads to final circuit 160 will produce one output signal while absence of at least one "zero" will produce a different output signal.

Thus in Table I, the presence of a "zero" in a comparison resultant would tend to produce the former output signal and absence of a "zero," the latter signal. A "two" in Table I is indicative of operation of one of the distinct comparison AND circuits of FIG. 1 since it reflects the presence of a "one" on each input to the AND circuit. It is effective to assure that the circuits comparing digits of lesser significance present "ones" on the inputs to the final circuit 160. Thus a "two" in Table I is effective to change all succeeding digits to "ones," as shown in Table II.

*Table II*

| Dec. No. | Dec. No. — $a_1a_2a_3$ / $b_1'b_2'b_3'$ | 7<br>111 | 6<br>110 | 5<br>101 | 4<br>100 | 3<br>011 | 2<br>010 | 1<br>001 | 0<br>000 |
|---|---|---|---|---|---|---|---|---|---|
| 7 | 111 | 222 | 221 | 212 | 211 | 122 | 121 | 112 | 111 |
| 6 | 110 | 221 | 221 | 211 | 211 | 121 | 121 | 111 | 110 |
| 5 | 101 | 121 | 211 | 212 | 211 | 112 | 111 | 102 | 101 |
| 4 | 100 | 211 | 211 | 211 | 211 | 111 | 110 | 101 | 100 |
| 3 | 011 | 122 | 121 | 112 | 111 | 022 | 021 | 012 | 011 |
| 2 | 010 | 121 | 121 | 111 | 110 | 021 | 021 | 011 | 010 |
| 1 | 001 | 112 | 111 | 102 | 101 | 012 | 011 | 002 | 001 |
| 0 | 000 | 111 | 110 | 101 | 100 | 011 | 010 | 001 | 000 |

It will be noted from Table II that all digits below the diagonal, and only those digits, contain "zeros." Thus only the numbers below the diagonal will produce the first output signal from the final AND circuit 160 of FIG. 1. All other numbers will produce the second output signal from AND circuit 160. Further study of Table II will reveal that for all comparison numbers below the diagonal, the augend number $a_1a_2a_3$ is smaller than the inverse $b_1b_2b_3$ of the addend number $b_1'b_2'b_3'$ and produces the first output signal. For all numbers on the diagonal the augend equals the inverse of the addend, and the second output signal is produced. For all numbers above the diagonal, the augend is larger than the inverse of the addend, also producing the second output signal.

I have found that my invention is adapted to servo systems requiring rapid and accurate positioning such as in a cathode ray device beam positioning system. One of the input numbers to the comparator may represent the input beam positioning address to the cathode ray tube. A coding plate may be inserted in the path of the electron beam which has been given a ribbon-like configuration, and the resultant signals on pickup plates positioned behind the coding plate represent a binary number which is fed to the other comparator input. Such a system is disclosed in patent No. 2,855,540, issued October 7, 1958, of C. W. Hoover, Jr. and R. W. Ketchledge. The coding plate is arranged such that correct positioning is attained when the complement of the input address number is received by the comparator from the pickup plates. Receipt of any other number from the pickup plates will produce one or the other of the output signals from the comparator serving to drive the cathode ray tube deflection plates so as to raise or lower the beam position until the correct position is reached. Thus from Table II it can be seen that if the number $b_1b_2b_3$ is the initial beam position address number and $a_1a_2a_3$ is the pickup plates output number, any resultant below the 111 positions will produce an output signal serving to drive upwards, while any resultant above 111 will produce an output signal serving to drive downwards to the 111 position of equality.

Figure 2:
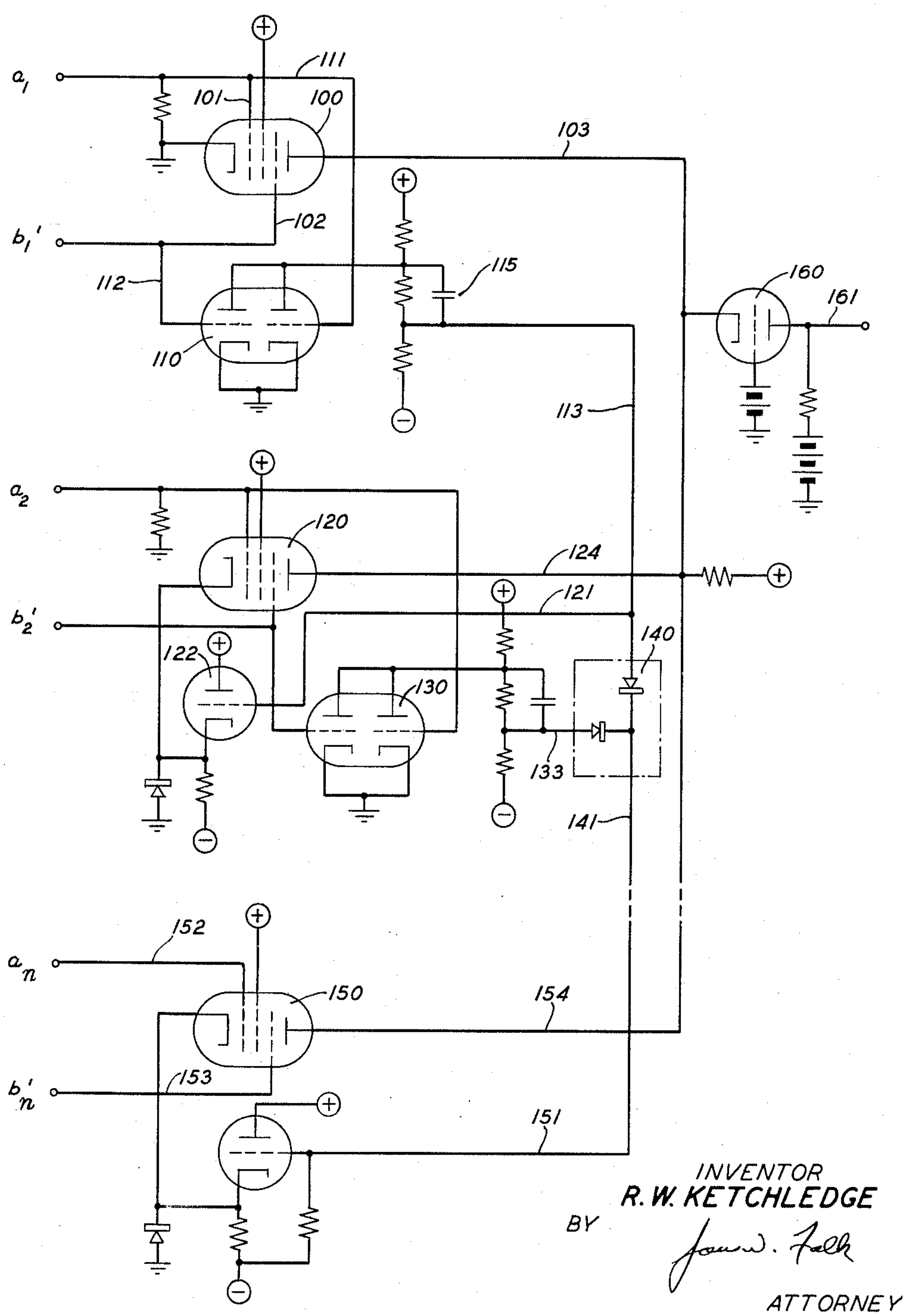
FIG. 2 is a simplified circuit schematic of a portion of the embodiment of FIG. 1.

FIG. 2 illustrates one of the many possible circuit arrangements for implementing the operation of the illustrative embodiment of this invention shown in FIG. 1. In this instance, for purposes of illustration, a negative voltage at the input indicates a "one" and a zero voltage or no voltage at the input indicates a "zero." A negative "one" potential on either or both control grids of OR circuit pentode 100 from inputs $a_1$ and $b_1'$ biases the tube below cutoff. A similar reaction occurs from application of "ones" on inputs $a_2, a_n$ and $b_2', b_n'$. If all of the OR circuit pentodes 100, 120 and 150 are cut off, there is no current flow through their respective plate circuits and the cathode potential of final AND circuit triode 160 rises to cut off that tube and thereby increase the potential in the output circuit 161.

With "ones" on both inputs $a_1$ and $b_1'$, AND circuit twin triode 110 will have negative potentials on both grids sufficient to cut off both tubes and a positive pulse will be developed across condenser 115. This pulse over leads 113 and 121 will cause cathode follower triode 122 to conduct more heavily, thereby making the cathode of OR circuit pentode 120 less negative. Tube 120 is cut off, thereby producing the same effect as a negative "one" digit input thereto from $a_2$ or $b_2'$.

The positive pulse on lead 113 also passes through a diode of OR circuit 140 to perform the above-described function in the circuits for lower order digits. Thus formation of such a positive pulse through cutoff of one of the twin triode AND circuits serves to cut off all succeeding pentode OR circuits.

Thus with one or more of the pentode OR circuits 100, 120 . . . 150 conducting, final AND circuit 160 conducts and the voltage on output lead 161 is held to a low value. With all pentode OR circuits cut off, final AND circuit 160 is cut off and the voltage on output lead 161 assumes a higher value.

The illustrative embodiment described hereinbefore assumes that both input numbers are in the conventional binary code. The illustrative embodiment described hereinafter demonstrates the flexibility of this invention by incorporating a circuit variation to permit the comparison of a conventional binary code number with a reflected binary code number.

Figure 3:
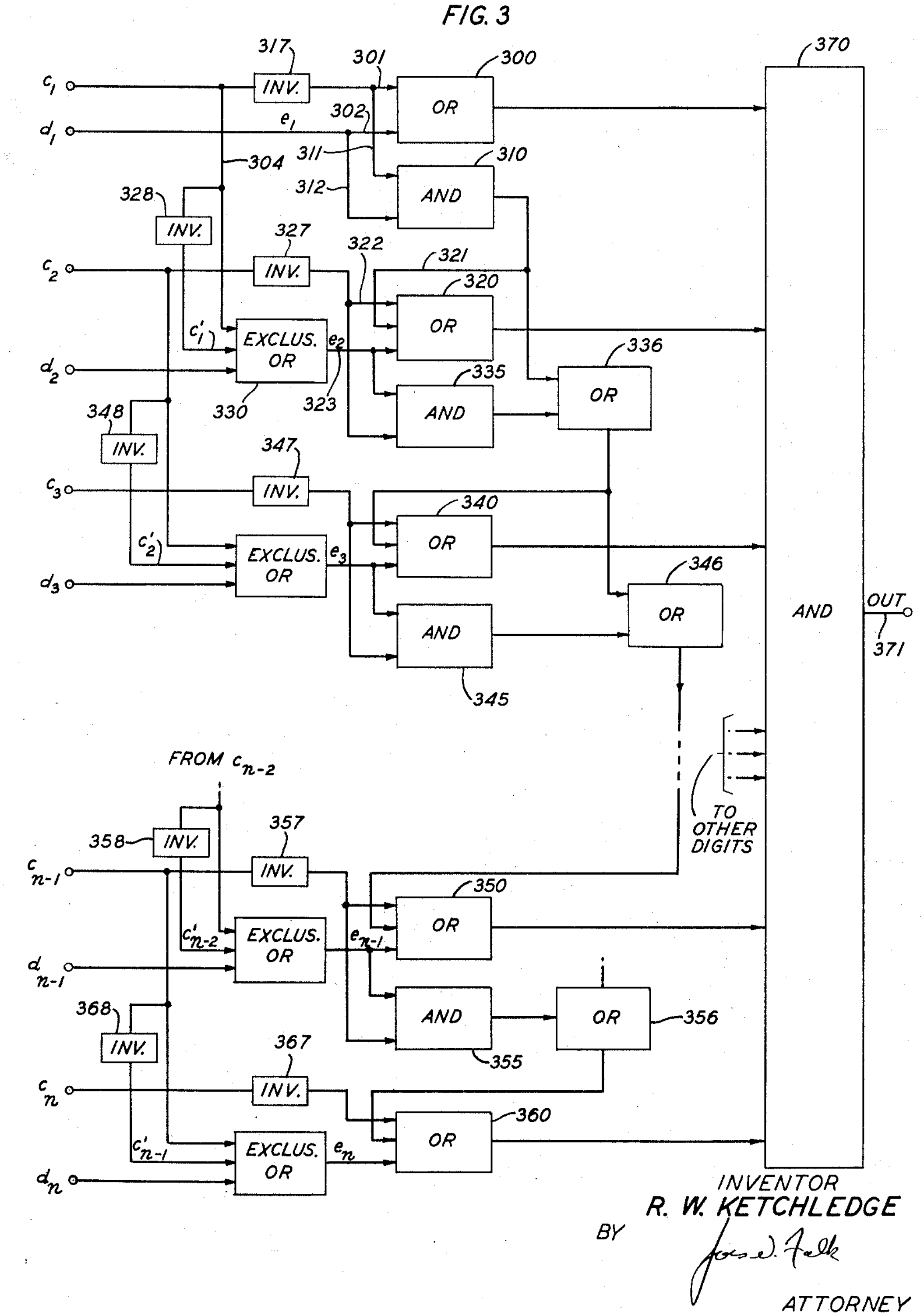
FIG. 3 is a diagrammatic representation of another specific illustrative embodiment of this invention.

As shown in FIG. 3 the logic elements required are identical to the elements shown in FIG. 1 for conventional binary code comparison with the addition of a logic element to each digit path which element is described as an exclusive OR circuit. Thus the OR circuits 300, 320, 340 . . . 350 and 360 correspond to OR circuits 100, 120 . . . 150 of FIG. 1; OR circuits 336, 346 . . . 356 correspond to OR circuits 140 . . . of FIG. 1; AND circuits 310, 335, 345 . . . 355 correspond to AND circuits 110, 130 . . . 150 of FIG. 1; and final AND circuit 370 corresponds to final AND circuit 160 of FIG. 1. In addition, as the exclusive OR circuits of FIG. 3 require both the input variable and the prime of the input variable of the conventional binary code number, I have shown the input variable applied to the input lead and an inverter circuit 317, 327, 347 . . . 357, 367 connected in the input leads to the OR circuits and a second group of inverters 328, 348 . . . 358, 368 connected from the input leads to the exclusive OR circuits of the next less significant digit. Upon completion of the operation performed by the exclusive OR circuit, the function of the comparator is essentially the same as the comparator of FIG. 1. Thus the following discussion will be directed primarily to the theory and operation of the exclusive OR circuit.

It will be assumed that the $c_1c_2 \ldots c_n$ input number in FIG. 3 is in conventional binary code while the $d_1d_2 \ldots d_n$ input number is in reflected binary code. Due to the inverters 317, 327, etc., it is the prime of the number $c_1c_2 \ldots c_n$ which is applied to the OR and AND circuits while the presence of the exclusive OR circuits results in a fictitious number $e_1e_2 \ldots e_n$, further discussed below, which is also directly applied to the OR and AND circuits. The final circuit 370 output signal on lead 371 is a selected one of two values dependent upon the presence of "ones" on all of the final circuit 370 input leads. A "zero" on any input lead produces the other output value. Thus, presenting the distinct comparison circuit OR and AND circuits with the equivalent of two conventional binary code numbers for comparison achieves the objective.

The exclusive OR circuits in FIG. 3 implement this requirement. By leaving the most significant digit of the input reflected binary code number $d_1d_2d_n$ unchanged and transforming any less significant digit if the digit in the conventional binary code number $c_1c_2c_n$ of next greater significance is a "one," the resultant arbitrary number $e_1e_2e_n$ effectively takes the place of a conventional binary number in the subsequent comparison. Comparing this resultant number $e_1e_2e_n$ with the inverse or prime $c_1'c_2'c_n'$ of the conventional binary code input number $c_1c_2c_n$ in the balance of the circuit, in accordance with the operation of the circuit in FIG. 1, yields the desired results.

Table III indicates the results obtained by the exclusive OR circuit in comparing a three digit reflected binary code input number $d_1d_2d_3$ with a conventional binary code number $c_1c_2c_3$ to obtain the arbitrary number ${}_1e_2e_3$. The process may be extended to any number of digits by increasing the number of parallel circuits in FIG. 3.

*Table III*

| Dec. No. | Dec. No. / $c_1c_2c_3$ / $d_1d_2d_3$ | 0<br>000 | 1<br>001 | 2<br>010 | 3<br>011 | 4<br>100 | 5<br>101 | 6<br>110 | 7<br>111 |
|---|---|---|---|---|---|---|---|---|---|
| 0 | 000 | 000 | 000 | 001 | 001 | 010 | 010 | 011 | 011 |
| 1 | 001 | 001 | 001 | 000 | 000 | 011 | 011 | 010 | 010 |
| 2 | 011 | 011 | 011 | 010 | 010 | 001 | 001 | 000 | 000 |
| 3 | 010 | 010 | 010 | 011 | 011 | 000 | 000 | 001 | 001 |
| 4 | 110 | 110 | 110 | 111 | 111 | 100 | 100 | 101 | 101 |
| 5 | 111 | 111 | 111 | 110 | 110 | 101 | 101 | 100 | 100 |
| 6 | 101 | 101 | 101 | 100 | 100 | 111 | 111 | 110 | 110 |
| 7 | 100 | 100 | 100 | 101 | 101 | 110 | 110 | 111 | 111 |

Table IV indicates the resultant numbers $f_1f_2f_3$ obtained by comparing any resultant number $e_1e_2e_3$ from Table III with the prime $c_1'c_2'c_3'$ of the conventional binary code input number $c_1c_2c_3$ in the balance of the circuit, remembering that a "two" in the resultant changes a "zero" in a digit of lesser significance into a "one."

*Table IV*

| Dec. No. | Dec. No. / $c_1c_2c_3$ / $c_1'c_2'c_3'$ — $d_1d_2d_3$ | 0 / 000 / 111 | 1 / 001 / 110 | 2 / 010 / 101 | 3 / 011 / 100 | 4 / 100 / 011 | 5 / 101 / 010 | 6 / 110 / 001 | 7 / 111 / 000 |
|---|---|---|---|---|---|---|---|---|---|
| 0 | 000 | 111 | 110 | 102 | 101 | 021 | 021 | 012 | 011 |
| 1 | 001 | 112 | 111 | 101 | 100 | 022 | 021 | 011 | 010 |
| 2 | 011 | 122 | 121 | 111 | 110 | 012 | 011 | 001 | 000 |
| 3 | 010 | 121 | 121 | 112 | 111 | 011 | 010 | 002 | 001 |
| 4 | 110 | 221 | 221 | 212 | 211 | 111 | 110 | 102 | 101 |
| 5 | 111 | 222 | 221 | 211 | 211 | 112 | 111 | 101 | 100 |
| 6 | 101 | 212 | 211 | 211 | 211 | 122 | 121 | 111 | 110 |
| 7 | 100 | 211 | 211 | 212 | 211 | 121 | 121 | 112 | 111 |

The column under the $c_1c_2c_3$ number 010 in Table IV, for example, was obtained by adding arithmetically, digit by digit, the complement $c_1'c_2'c_3'$ of 010, namely 101, to each of the resultant numbers $e_1e_2e_3$ in the column under 010 in Table III with the change of "zeros" preceded by "twos" to "ones," as shown in Table V.

*Table V*

| $e_1e_2e_3$ | | $c_1'c_2'c_3'$ | | | | $f_1f_2f_3$ |
|---|---|---|---|---|---|---|
| 001 | + | 101 | = | | | 102 |
| 000 | + | 101 | = | | | 101 |
| 010 | + | 101 | = | | | 111 |
| 011 | + | 101 | = | | | 112 |
| 111 | + | 101 | = | | | 212 |
| 110 | + | 101 | = | | | 211 |
| 100 | + | 101 | = | 201 | = | 211 |
| 101 | + | 101 | = | 202 | = | 212 |

Table IV indicates that the input conventional binary code number $c_1c_2c_3$ is larger than the reflected binary code input number $d_1d_2d_3$ when the resultant number $f_1f_2f_3$ contains a "zero." Absence of a "zero" in the resultant number $f_1f_2f_3$ indicates that the conventional binary code number $c_1c_2c_3$ is equal to or less than the reflected binary code number $d_1d_2d_3$.

The circuit in FIG. 3 implements this comparison by provision of one output signal when a "zero" is present on any input lead to output AND circuit 370 and provision of a second output signal when no "zero" is present on any of said input leads.

The exclusive OR circuits in FIG. 3 compart a digit of the reflected binary code number with the next more significant digit of the conventional binary code number. If the latter digit is a "zero" the output is the same as the former digit. If the latter digit is a "one" the output is the opposite of the former digit.

Figure 4:
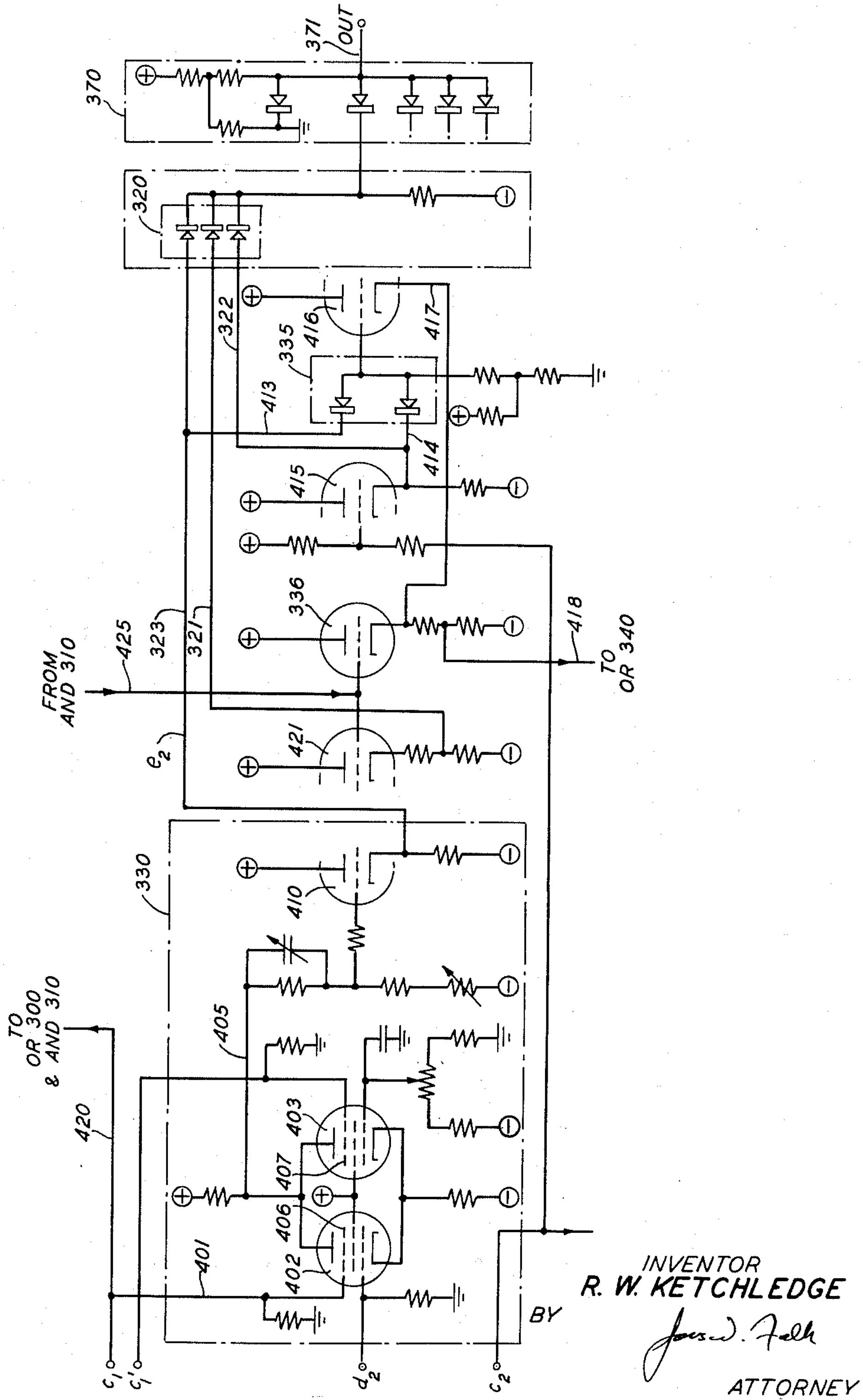
FIG. 4 is a schematic representation of a portion of the embodiment shown in FIG. 3.

An example of a circuit for accomplishing these results is shown in FIG. 4. The balance of the logical elements to complete one digital comparison is also shown. The reflected binary code digit $d_2$ is applied to the exclusive OR circuit 330 along with the next more significant digit of the conventional binary code number $c_1$ and its prime $c_1'$. For purposes of this example a "one" digit signal at an input is a negative potential, and a "zero" digit signal is a ground or positive potential. The potentials on the $c_1$ lead will of course be the reverse of those on the $c_1'$ lead to form the prime of the $c_1$ digit. Pentode tubes 402 and 403 of exclusive OR circuit 330 have common connections between the plates and between the cathodes. The common screen grid is placed at a high positive potential. Both tubes are normally conducting. The input digit $c_1$ signal is imposed on the grid 406 of tube 402 and its prime $c_1'$ on the grid 407 of tube 403.

Assume first that $c_1$ and $d_2$ are both negative potential "one" digit signals. The control grid of tube 402 has the $d_2$ signal impressed thereon which is sufficiently negative with respect to the cathode in this instance to cut off the tube. With tube 402 cut off the cathode of tube 403 becomes sufficiently negative to start conduction in tube 403, and the $c_1'$ signal which is positive in this instance further increases flow in the plate circuit, thereby reducing the potential on lead 405 which is impressed on the grid of cathode follower 410. Flow through tube 410 decreases as does the potential on lead 323. The low potential on lead 323 represents a "zero" while a higher potential on this lead represents a "one." Thus in this instance the "one" digit signal at $c_1$ served in effect to reverse the "one" digit signal at $d_2$ to a "zero."

Assume next that $c_1$ carries a positive "zero" signal and $d_2$ a negative "one" signal. Again tube 402 is cut off and flow in tube 403 is started. Grid 407 of tube 403, supplied by $c_1'$, is negative in this instance so that electron flow is directed to the positive screen grid rather than the plate. With no current flow in the plate circuit, the potential on lead 405 increases as does that on lead 323 due to action of cathode follower 410. The higher relative potential on this lead represents a "one." Thus in this instance presence of the "zero" digit signal at $c_1$ in effect preserves the "one" digit signal at $d_2$.

With $d_2$ carrying a positive "zero" potential, the action of tubes 402 and 403 is reversed; i.e., tube 402 conducts to the plate or screen, depending upon the "zero" or "one" status of lead $c_1$, and tube 403 is biased beyond cutoff due to a less negative potential on the cathode when tube 406 is conducting. Thus a "one" digit signal on lead $c_1$ directs electron flow to the screen grid of tube 406 so that the voltage on lead 323 is increased. This action, in effect, changes the "zero" digit signal from lead $d_2$ to a "one" on lead 323. A "zero" on $c_1$ increases current flow through tube 406, decreases the potential on lead 323, and thus preserves the "zero" from $d_2$ on lead 323.

The OR circuit 320 in FIG. 4 comprises three diodes any one of which will conduct upon receipt of a positive signal $e_2$ over lead 323; over lead 322 carrying the $c_2$ signal through cathode follower 415 and, in effect, presenting OR circuit 320 with the prime of $c_2$; or over lead 321 carrying the output of the preceding AND circuit 310. If OR circuit 320 conducts, the diode of the final AND circuit 370, connected thereto, will be cut off. With all of the final AND circuit 370 diodes cut off, a "one" output signal on lead 371 is provided which is larger than the "zero" output signal on lead 371 when one or more of the final AND circuit 370 diodes are conducting.

The AND circuit 335 comprises two diodes which maintain the grid of cathode follower 416 at a low potential until both diodes are cut off by positive "one" digit potentials. A positive potential on lead 413 represents the $e_2$ digit equivalent to a "one." A positive potential on lead 414 represents the $c_2$ "zero" digit, but it serves to activate a diode of AND circuit 335 in a manner equivalent to that expected of a "one" digit, so that it is, in effect, the inverse or prime of the "zero" digit. The potential on the grid of tube 416 is increased thereby, which in turn increases conduction through tube 416 and increases the potential on lead 418 to pass a "one" signal to the following digit comparison circuits. Also, a positive "one" signal from the preceding digit comparison circuit over lead 425 raises the grid potential of OR circuit cathode follower 336, thus increasing the potential on lead 418 to present a "one" signal to succeeding circuits. It has a similar effect on cathode follower 421 to provide a "one" signal to OR circuit 320 over lead 323.

Reference is made to my application Serial No. 581,174, filed April 27, 1956, wherein a related invention is disclosed and claimed.

It is to be understood that the above-described arrangements are illustrative of the application of the principles of the invention. Numerous other arrangements may be devised by those skilled in the art without departing from the spirit and scope of the invention.

What is claimed is:

1. An electrical circuit for comparing two binary code numbers in which digit values are characterized by one of two possible signals comprising an output circuit, a plurality of comparison circuits each comprising AND and OR logic circuits, means applying signals representative of digits of the same significance in said two numbers simultaneously to each of said AND and OR circuits in each of said comparison circuits, means for applying the output of each of said OR circuits to said output circuit, and means for applying the output of each of said AND circuits to said OR circuits in all lesser significant digit comparison circuits.

2. A system for comparing multiple element binary code numbers in which element values are characterized by one or the other of two possible signaling conditions comprising multiple position comparison means having distinct first and second logic circuits in each position, means for applying each pair of elements of corresponding significance in the binary code numbers to said first and second logic circuits in the corresponding comparison position, means for applying the output of each of said second logic circuits to said first logic circuits in all lesser significant digit comparison positions, a final logic circuit, and means for applying the output of each of said first logic circuits to said final logic circuit, said final logic circuit responsive to receipt of said first logic circuit output signals to generate a selected one of two output signals indicative of the larger of the two compared binary code numbers.

3. A comparator for producing an output signal indicative of the relative magnitudes of a multidigit conventional binary code number and a multidigit reflected binary code number comprising a plurality of distinct comparison circuits for each of the multidigit code numbers, means for applying signals derived from the respective digits of the conventional binary code number to each of said comparison circuits, means for applying to each of said comparison circuits a signal derived from the corresponding digit of the reflected binary code number and the next more significant digit of the conventional binary code number, a final circuit, means for applying one output of each of said comparison circuits to said final circuit, and means for applying another output of each of said comparison circuits as an input to the lesser significant digit comparison circuits.

4. A comparator for producing an output signal indicative of the relative magnitudes of two multidigit binary numbers comprising a comparison circuit for each digit position, each comparison circuit including an OR circuit and a first AND circuit, a final AND circuit, first means for applying signals indicative of a distinct digit in each of the numbers simultaneously to said OR and first AND circuits in the corresponding comparison circuit, second means for applying the output of each of said first AND circuits to said OR circuits in lesser significant digit comparison circuits, and third means for applying the output of each of said OR circuits to said final AND circuit.

5. A comparator in accordance with claim 4 wherein each of said OR circuits comprises an electron discharge device having a cathode, a plurality of grids and an anode, said first means being connected to a first one of said grids for one of the numbers and a second one of said grids for the other number, and said second means being connected to said cathode, a signal of one polarity on one of said first and second grids and of opposite polarity on said cathode providing one signal condition at said anode and absence of the signal of one polarity on one of said grids and of opposite polarity on said cathode providing another signal condition at said anode.

6. A comparison circuit in accordance with claim 4 and further comprising a plurality of exclusive OR circuits, each of said exclusive OR circuits being connected to an AND circuit and an OR circuit, first means applying a signal indicative of a digit value of one of said numbers to each of said exclusive OR circuits, and second means applying a signal indicative of the value of the next more significant digit of the other of said numbers to each of said exclusive OR circuits.

7. A comparison circuit in accordance with claim 6 wherein each of said exclusive OR circuits comprises first and second electron discharge devices each having a cathode, a plurality of grid elements and an anode, said first means being connected to a first one of said grids in said first device and said second means being connected to a second one of said grids in said first device and through a signal inverter circuit to one of said grids in said second device, a common anode circuit, signals of opposite polarity on said first and second grids of said first device providing a distinct signal condition in the common anode circuit and signals of the same polarity on said first and second grids of said first device providing another distinct signal condition in the common anode circuit.

8. A comparison circuit for producing an output signal indicative of the relative magnitudes of two binary numbers comprising a plurality of OR circuits and a plurality of AND circuits, means for applying each but the least significant digit of one number and the prime of each but the least significant digit of the other number to one of said OR and one of said AND circuits, digits of the same significance being applied to the same OR and AND circuits, means for applying the output of each AND circuit to each OR circuit of a less significant digit, means for applying the least significant digit of said one number and the prime of the least significant digit of said other number only to one of said OR circuits, a distinct AND circuit, and means for applying the outputs of each of said OR circuits to said distinct AND circuit.

9. A system for deriving the relative magnitudes of two multiple digit binary code numbers, said system comprising first, intermediate and last digit comparison circuits arranged to compare the corresponding most, intermediate and least significant digits of said binary code numbers, an OR logic gate in each of said digit comparison circuits, an AND logic gate in each of said first and intermediate comparison circuits, means for applying to each of said OR and AND logic gates in their respective comparison circuits signals derived from corresponding digits of said binary code numbers, a plurality of carry OR logic gates, means including said carry OR logic gates for applying the output of said AND logic gates to said OR logic gates in comparison circuits for lesser significant digits, and a final AND logic gate commonly connected to said input OR logic gates, said final AND logic gate responsive to a first output condition of all of said input OR logic gates to provide a first output signal indicating that one of said binary numbers equals or is larger than the other of said binary numbers, and responsive to an absence of said first output condition of at least one of said OR logic gates to provide a second output signal indicating that said other binary number is larger than said one binary number.

10. A system for comparing a first multiple digit binary code number of one code permutation type with a second multiple digit binary code number of another code permutation type comprising first, intermediate, and last digit comparison circuits corresponding to the most, intermediate, and least significant digits of said binary code numbers, an OR logic gate in each of said comparison circuits, an AND logic gate in each of said first and intermediate comparison circuits, means for applying to each of said OR and AND logic gates in their respective comparison circuits signals derived from the digits of said first number, an exclusive OR logic gate connected to each of said intermediate and last comparison circuits, each of said exclusive OR gates responsive to a signal from the corresponding digit of said second number and a signal from the next more significant digit of said first number to provide a signal to each of said OR and AND logic gates in the corresponding comparison circuit, a final AND logic gate, means for applying the output of the OR logic gates to said final AND logic gate, and means for applying the output of said AND logic gates to the OR logic gates in comparison circuits for lesser significant digits of said numbers, said final AND logic gates responsive to signals of one type from all of said OR logic gates to provide a first output signal and responsive to said signals of said one type from less than all of said OR logic gates to provide a second output signal, said first and second output signal indicative of the relative magnitude of said first and second numbers.

11. An electrical circuit for comparing first and second multi-digit binary code numbers comprising a plurality of digit comparison circuits each corresponding to a distinct digit order of said binary numbers, first means for applying the digits of the first number to one input in each of said digit comparison circuits, logic means associated with each digit comparison circuit, means for applying the corresponding digit of the second number and the next more significant digit of the first number to said logic means, means for applying the output of said logic means to another input in the associated comparison circuit, an output AND circuit, and means for applying an output of each of said comparison circuits to said output circuit.

12. An electrical circuit for comparing first and second multidigit binary code numbers comprising a plurality of digit comparison circuits each corresponding to a distinct digit order in said binary numbers, means for applying the digits of the first number to said corresponding comparison circuits, means controlled by the next higher order digit in the first number for applying the digits of the second number to the corresponding comparison circuits, an output AND circuit, means for applying one output of each of said comparison circuits to said output AND circuit, and means for applying a second output of each of said comparison circuits to an input of the next lower order digit comparison circuit.

13. A number comparison system employing equal length multiple element code groups in which element values are characterized by one of two possible signaling conditions, said system comprising a plurality of signal comparison circuits each having an AND gate and an OR gate, means for applying to each of said AND and OR gates an input signal representing a distinct element of one significance in one of the code groups and an input signal representing the distinct element of corresponding significance in the other code group, means for applying the output of each of said AND gates as a third input signal to said OR gate in each comparison circuit comparing signals representing elements of lesser significance in the code groups, a final AND gate, and means for applying the outputs of all of said OR gates to said final AND gate to generate a selected one of two electrical signals representing the relative magnitudes of said two code groups.

14. A comparison system for producing an output signal indicative of the relative magnitudes of two multidigit binary numbers comprising a plurality of comparison circuits including first and second logic circuits, each of said logic circuits being arranged to receive signals representing distinct digits of the same significance in the numbers, a final AND circuit, means for applying the output of said first logic circuit in each of said comparison circuits to said final circuit, and means for applying the output of said second logic circuit in each of said comparison circuits to an input of said first logic circuits in said comparison circuits arranged to receive signals representing lesser significant digits of the numbers.

References Cited in the file of this patent

UNITED STATES PATENTS

| | | |
|---|---|---|
| 2,609,143 | Stibitz | Sept. 2, 1952 |
| 2,674,727 | Spielberg | Apr. 6, 1954 |
| 2,784,396 | Kaiser et al. | Mar. 5, 1957 |
| 2,784,397 | Branson et al. | Mar. 5, 1957 |
| 2,785,856 | Hobbs | Mar. 7, 1957 |
| 2,813,259 | Burkhart | Nov. 12, 1957 |
| 2,821,696 | Shiowitz et al. | Jan. 28, 1958 |
| 2,837,732 | Nelson | June 3, 1958 |
| 2,843,837 | Thaler et al. | July 15, 1948 |
| 2,844,309 | Ayres | July 22, 1958 |
| 2,865,567 | Booth | Dec. 23, 1958 |
| 2,877,445 | Cheilik | Mar. 10, 1959 |
| 2,884,616 | Fillebrown | Apr. 28, 1959 |
| 2,885,655 | Smoliar | May 5, 1959 |
| 2,900,620 | Johnson | Aug. 18, 1959 |
| 2,907,877 | Johnson | Oct. 6, 1959 |
| 2,946,983 | Borders et al. | July 26, 1960 |

FOREIGN PATENTS

| | | |
|---|---|---|
| 156,443 | Australia | May 12, 1954 |